Nov. 6, 1962 L. E. WATERS ETAL 3,061,928
TOOL FOR CUTTING, SCRAPING, AND STRIPPING
MATERIAL FROM A SURFACE
Filed March 30, 1961

INVENTORS.
CHARLES C. CHEW
LAWRENCE E. WATERS
BY
Oldham & Oldham
ATTYS.

United States Patent Office 3,061,928
Patented Nov. 6, 1962

3,061,928
TOOL FOR CUTTING, SCRAPING, AND STRIPPING MATERIAL FROM A SURFACE
Lawrence E. Waters, 3745 Albrecht, Akron 12, Ohio, and Charles C. Chew, 347 Earl Court, Akron 4, Ohio
Filed Mar. 30, 1961, Ser. No. 99,557
2 Claims. (Cl. 30—169)

This invention relates to a hand implement for the ready and efficient removal of material from a surface area. In a preferred embodiment the invention relates to a cutting, scraping and stripping tool that serves as a lightweight, balanced, easily handled and ideally suited means for the stripping of a layer, or layers, of wall covering material from wall surfaces and which while most readily cleaned serves to resist the sticking and clinging of gum-like matter and materials to the tool.

One object of the invention is the provision of a hand type cutting, scraping and stripping tool employing a replaceable and flexible cutting blade means so arranged in relation to a substantial surface area on the tool that in operation when the tool surface area coincides with and is guided by the surface to be operated upon the cutting blade means is flexed and the blade cutting edge maintained under pressure for accurately controlled cutting action. Further, the tool is of a lightweight construction employing a rust-proof, metallic surface having a high degree of smoothness for which such material as contacted in cutting and scraping would lack affinity.

An additional object is the provision of a tool for removing material from a surface and wherein the tool has a relatively large surface area thereon and a flexible cutting blade extending from the tool at an angle with the tool surface area, the arrangement being such that the flexible cutting blade is flexed and guided under tension along the plane of the surface to be acted upon when the tool surface is actuated therealong. Also, further provision is made for the accurate positioning and locking of the blade within the tool including a removable segment of the tool having a face thereon for contact with a corresponding face on the tool together with means for securely clamping and fastening these faces and wherein one of the faces is recessed for retaining the blade and with the base or lip serving for the accurate positioning of the cutting blade in the predetermined position as secured thereon by the locking means. The design of the cutting blade and the blade retaining surfaces of the tool may be such that during actual cutting operations the blade retaining surfaces may be separated somewhat under pressure applied at the apex end in cooperative action for positioning the blade under tension for the proper cutting action and for securely gripping the blade at all other times. However, the blade dimensions and flexibility are preferably so designed that pressure applied along the blade during cutting action results in flexing of the blade only in retaining the blade tension for controlled cutting.

A further object of the invention is to provision of an alternate form of cutting head for preventing possible gouging when the tool operating surface is not held flush against the surface to be acted upon.

The foregoing objects of the invention and other objects will become apparent as the description proceeds. For a better understanding of the invention reference should be had to the accompanying drawings wherein.

Figure 1:
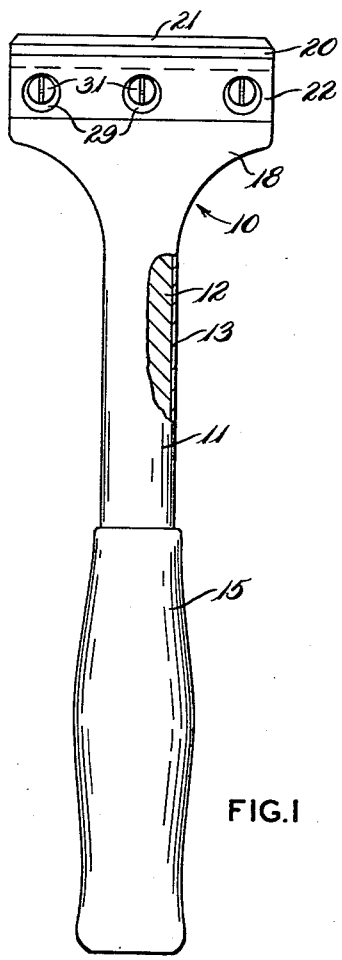
FIG. 1 is a front elevation, partially in section, of a cutting tool incorporating the principles of the invention.

In the drawings, the particular embodiment of the invention disclosed relates to a T-shaped wallpaper cutting, scraping and stripping tool indicated generally by the numeral 10. The tool is of a balanced lightweight, one-piece construction employing a rustproof surface of exceptional smoothness that may be readily cleaned and which resists adherence of any materials such as glue and paper to the tool.

The tool including the handle 11 is of one-piece construction and as shown in the front elevational section of FIG. 1 taken on the handle is constructed of cast aluminum 12 employing a chromium coated finish 13. To the handle 11 is affixed a rubber or plastic grip 15 for the positive handling and control of the tool.

Figure 2:
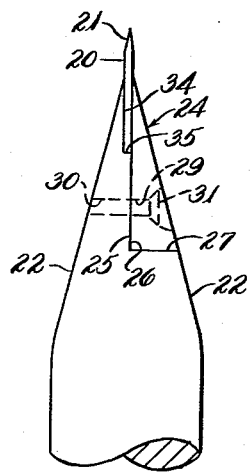
FIG. 2 is a fragmentary side elevation of the head portion of the tool with the blade locked in operating position therein.

The tool includes a head portion 18 from which there extends a thin flexible cutting blade 20. The head 18 is symmetrically formed on the tool and includes two tool guiding surfaces 22 which are sloped or angularly projected to the apex end of the tool from which the cutting blade 20 is projected. These guiding surface areas each measure in one preferred embodiment 3″+1/32-0 width across the face and 7/8″ in length, apart from the blade which protrudes from the apex thereof in a manner bisecting the angles formed by these surfaces along a center line of the tool as shown in FIG. 2. The sloping surfaces thus form a triangle and each surface forms an angle with the center line of about 12° to 18° but by preference the angle so formed being about 15° and with the flexible cutting blade extending along the center line.

The replaceable thin flexible cutting blade 20, as shown in FIGURES 1 and 2 is very slightly less in width than the transverse guiding faces 22 of the tool head and accordingly may be about 3″+0-1/32 in width. The blade 20 is approximately 5/16″ in length including the beveled surfaces 21 of 1/16″ and has a thickness of about, or slightly less than, 1/64″. The blade is clamped within the tool to a predetermined depth of about 1/8″ and accordingly extends a distance of about 3/16″ from the apex and is bisected by the planes formed by the tool guiding surface areas.

A segment of the head of the tool 24 is removable and employed for replacing and locking the cutting blade in a predetermined position. The segment 24 includes a face portion 25 normally closed upon a corresponding stationary face of the tool 26 and included in the plane bisecting the tool guiding surfaces 22. The countersunk and threaded holes 29 extend through the movable segment for alignment and cooperation with the threaded openings 30 on the corresponding opposite guide face and portion of the tool. The screw fastening members 31, preferably three in number as shown, enable the tool segment 24 to be tightly clamped into position for locking a blade therein. A recessed pocket 34 of about 1/64″ or slightly less in thickness and 1/8″ height extends along the upper face of the nonmovable segment of the tool and includes a base or lip portion 35 for receiving and supporting the flexible cutting blade 20 in an accurate position when the movable tool segment 24 is in locked-in position.

Thus, when the tool is not in use it is desirable to remove the cutting blade and also to replace the blade at proper times and such operations are readily accomplished by loosening the screws 31 for release of the clamping action of the tool segment 24 and for tightening the screw fastening members 31 upon replacement of and locking of the blade in the predetermined position in the recess 34 of the stationary segment.

Figure 3:
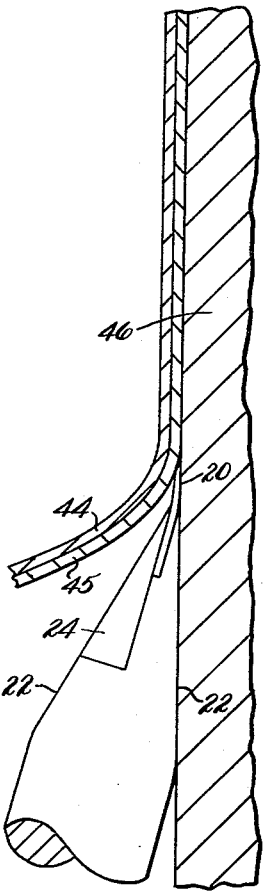
FIG. 3 is an enlarged side elevational view of the tool as applied to a wall surface in the removal of layers of paper and adhesives, etc.
Figure 4:
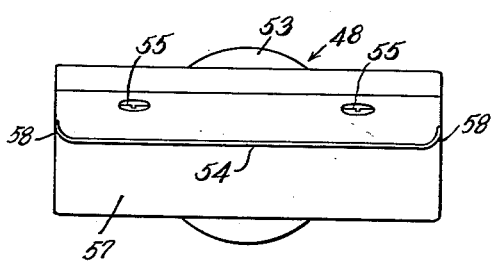
FIG. 4 is a top plan view of an alternate form of cutting head.
Figure 5:
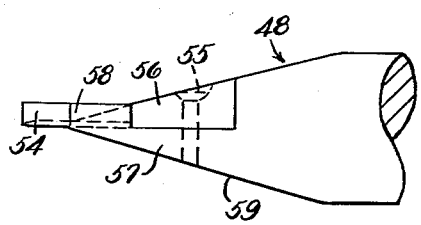
FIG. 5 is a side elevational view of the alternate cutting head of FIG. 4.

It will be understood that a plane formed by each of the tool surface areas bisects the flexible cutting tool blade with the result that when a tool surface area is placed against a wall surface the blade is flexed and maintained in a position under tension for accurate guidance along the surface of the wall for a resulting closely controlled cutting action. This controlled cutting action, as shown in FIG. 3, is such as to be capable of a greatly superior cutting and stripping action for the removal of a layer, or layers, of wallpaper 44 together with the glue or adhesive material 45 from a wall 46 in a readily performed and efficient manner. The modified cutting tool head as shown by FIGS. 4 and 5 discloses the tool head as generally indicated at 48 together with the handle 53. The tool head has the same general construction described and shown in FIGS. 1 and 2. However, the tool blade clamping means employs only two screw fastening members 55 for positioning tool segment 56 with corresponding segment 57 and locking the cutting blade 54 between the segments 56, and 57. The segment 57 is provided with upwardly curved portions 58. The segment 56 extends into the area between the curved portions. The segment 56 holds the blade 54 against the curved portions providing the blade with curved ends. With the ends of the cutting blade so curved the operation of the tool is such that possible gouging of the wall surface by the ends of the blade is prevented when the tool head guiding surface 59 is not held level on the wall surface. With this construction the tool guiding surface 59 is employed exclusively in the operation of the tool. The guided and controlled action of the cutting blade in operation is such as to avoid any dulling of the blade by unnecessary scraping or cutting into the wall surfaces and the material may be stripped from the wall without the use of steam and soaking of the material to be removed in an optimum manner.

By way of further description of the structure of the invention it can be stated that the removable segment 24 of the head is of bar-like shape and has a right angle triangle shape in cross section, the long leg of the triangle lying in the plane of the axis of the handle and the short leg of the triangle being perpendicular to the axis of the handle, and the hypotenuse of the triangle lying in the guide surface and being greater than half the length of the guide surface but shorter than the length of the guide surface. The flexible blade itself, as aforesaid, has a width just slightly less than the width of the head and is of a length of less than half of the length of the guide surface. Further, it can be stated that the shoulder 35 against which the inner edge of the blade engages is positioned about midway of the long leg of the triangle of the segment 24.

While a certain representative embodiment and details have been shown for the purpose of illustrating the invention, it will be apparent to those skilled in this art that various changes and modifications may be made therein without departing from the spirit or scope of the invention.

What is claimed is:

1. A tool for scraping off wall paper and the like including a handle, an integral wide flat head on the handle, said head being formed on both sides with a guide surface about 3 inches wide and about ⅞ inches long, these guide surfaces each making an angle of between about 12 and about 18 degrees with the axis of the handle, one side of the head having a removable bar-like segment having a right angle triangle shape in cross section, the long leg of the triangle lying in the plane of the axis of the handle and the short leg of the triangle being perpendicular to the axis of the handle, the hypotenuse of the triangle lying in the guide surface and being greater than half the length of the guide surface but shorter than the length of the guide surface, means removably clamping the segment to the head, a thin flexible blade of a width just slightly less than the width of the head, and of a length of less than half of the length of the guide surface clamped by the segment in the head so that the edge of the blade extends beyond the head, the portion of the head engaging the blade and opposed to the segment being formed with an offset and shoulder for receiving the blade, the shoulder being about midway of the long leg of the triangle of the segment, said blade having sufficient flexibility so that in the use of the tool with a guide surface positioned against a wall the blade flexes into alignment with the guide surface.

2. A tool for scraping off wall paper and the like including a handle, an integral wide flat head on the handle, said head being formed on both sides with a guide surface, these guide surfaces each making an angle of between about 12 and about 18 degrees with the axis of the handle, one side of the head having a removable bar-like segment having a substantially right angle triangle shape in cross section, the long leg of the triangle lying in the plane of the axis of the handle and the short leg of the triangle being substantially perpendicular to the axis of the handle, the hypotenuse of the triangle lying in the guide surface, means removably clamping the segment to the head, a thin flexible blade clamped by the segment in the head so that the edge of the blade extends beyond the head, the portion of the head engaging the blade and opposed to the segment being formed with an offset and shoulder for receiving the blade, said blade having sufficient flexibility so that in the use of the tool with a guide surface positioned against a wall the blade flexes into alignment with the guide surface.

References Cited in the file of this patent

UNITED STATES PATENTS

| | | |
|---|---|---|
| 1,294,543 | Sanford | Feb. 18, 1919 |
| 2,236,323 | Stachowiak | Mar. 25, 1941 |
| 2,601,450 | O'Neill | June 24, 1952 |
| 2,610,401 | Vosbikian et al. | Sept. 16, 1952 |
| 2,686,968 | Almlof | Aug. 24, 1954 |
| 2,818,642 | Judd | Jan. 7, 1958 |

FOREIGN PATENTS

| | | |
|---|---|---|
| 169,771 | Great Britain | Sept. 26, 1921 |